(12) United States Patent
Smillie

(10) Patent No.: US 7,303,793 B2
(45) Date of Patent: Dec. 4, 2007

(54) MULTI-LAYER SHEET HAVING A WEATHERABLE SURFACE LAYER

(75) Inventor: Benjamin Andrew Smillie, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 368 days.

(21) Appl. No.: 10/960,426

(22) Filed: Oct. 7, 2004

(65) Prior Publication Data

US 2005/0084697 A1   Apr. 21, 2005

Related U.S. Application Data

(60) Provisional application No. 60/509,187, filed on Oct. 7, 2003.

(51) Int. Cl.
*B32B 27/08* (2006.01)
*B32B 27/18* (2006.01)
*B32B 27/30* (2006.01)

(52) U.S. Cl. ............... 428/31; 428/421; 428/522; 428/523

(58) Field of Classification Search ............ 428/31, 428/421, 522, 523
See application file for complete search history.

(56) References Cited

U.S. PATENT DOCUMENTS

| | | |
|---|---|---|
| 3,264,272 A | 8/1966 | Rees |
| 3,791,915 A | 2/1974 | Goehring et al. |
| 4,351,931 A | 9/1982 | Armitage |
| 4,444,826 A | 4/1984 | Sasaki et al. |
| 4,677,017 A * | 6/1987 | DeAntonis et al. ......... 428/214 |
| 4,868,030 A | 9/1989 | Mentzer et al. |
| 4,931,324 A | 6/1990 | Ellison et al. |
| 4,943,680 A | 7/1990 | Ellison et al. |
| 5,028,674 A | 7/1991 | Hatch et al. |
| 5,114,789 A | 5/1992 | Reafler |
| 5,198,401 A | 3/1993 | Turner et al. |
| 5,272,236 A | 12/1993 | Lai et al. |
| 5,278,272 A | 1/1994 | Lai et al. |
| 5,324,800 A | 6/1994 | Welborn, Jr. et al. |
| 5,342,666 A | 8/1994 | Ellison et al. |
| 5,405,922 A | 4/1995 | DeChellis et al. |
| 5,514,427 A | 5/1996 | Ellison et al. |
| 5,536,539 A | 7/1996 | Ellison et al. |
| 5,707,697 A | 1/1998 | Spain et al. |
| 5,725,712 A | 3/1998 | Spain et al. |
| 5,866,658 A | 2/1999 | Talkowski |
| 5,985,079 A | 11/1999 | Ellison |
| 6,306,503 B1 * | 10/2001 | Tsai .................... 428/412 |
| 6,399,193 B1 | 6/2002 | Ellison |
| 2004/0023037 A1 * | 2/2004 | Baumert et al. ........... 428/421 |
| 2004/0159634 A1 * | 8/2004 | Kiessling et al. ........... 216/65 |

FOREIGN PATENT DOCUMENTS

| | | |
|---|---|---|
| EP | 0 342 244 A1 | 11/1989 |
| EP | 0 343 877 A2 | 11/1989 |
| EP | 0 949 120 A1 | 10/1999 |
| EP | 1 093 911 A2 | 4/2001 |
| JP | SHO58-155953 A | 9/1983 |
| JP | 02 030528 A | 1/1990 |
| WO | WO 98/41399 A1 | 9/1998 |
| WO | WO 02/066249 A1 | 8/2002 |

OTHER PUBLICATIONS

PCT International Search Report for International application No. PCT/US2004/033438, dated Feb. 17, 2005.

* cited by examiner

*Primary Examiner*—Ramsey Zacharia

(57) ABSTRACT

A multi-layer sheet and a process for producing the sheet are disclosed. The sheet can comprise a first polymer layer comprising a weatherable film of polyvinyl fluoride (PVF) or polyvinylidene fluoride (PVDF) having an adhesive coating on one side; second pigmented polymer layer extruded onto the adhesive coating of the first polymer layer; and optionally a third extruded thermoformable polymer backing layer. The process can comprise combining a pigmented polymer onto the adhesive coating surface of the weatherable film of PVF or PVDF, passing the resulting structure into a nip of two rolls under pressure and subsequently an optional third thermoformable polymer backing layer is extruded or laminated onto the pigmented polymer layer.

12 Claims, No Drawings

MULTI-LAYER SHEET HAVING A WEATHERABLE SURFACE LAYER

This application claims priority from Provisional U.S. Patent Application Ser. No. 60/509,187, filed Oct. 7, 2003, the entire disclosure of which is incorporated herein by reference.

BACKGROUND OF THE INVENTION

This invention is directed to a decorative multi-layer sheet and in particular to a multi-layer sheet film that has a weatherable surface layer.

A variety of processes have been developed to form decorative multi-layer sheet structures that can be molded into parts but each of these processes has problems that make the multi-layer sheet unacceptable, for example, for exterior automotive or truck use, due to wrinkles and air-pockets in the multi-layer sheet. Recycling of the multi-layer sheet material also is a problem since the fluoropolymer component of a multi-layer sheet must be separated from the thermoplastic layers of the sheet. When using reflective flakes in the colored layer of the sheet structure, such as aluminum flakes, proper orientation of the flakes must be achieved to have the desired appearance that will not occur unless proper processing conditions and polymers are used.

For example, U.S. Pat. No. 5,707,697 discloses a dry paint transfer process for forming DOI (Distinctness of Image) multi-layer sheet materials. "DOI" is a measure of the "degree of definition" of a reflection of an object in a colored finish compared to the actual object itself. DOI is defined in ASTM Standard-D5767-95 as: distinctness-of-image-gloss, n-aspect of gloss characterized by the sharpness of images of objects produced by reflection at a surface. DOI can be measured with a BYK-Gardner Wavescan DOI instrument. In the automotive industry, satisfactory finishes on a smooth or "Class A" surface typically will have a DOI value of at least 60 and preferably, 80 or higher. U.S. Pat. Nos. 4,931,324; 5,514,427; and 5,342,666 disclose processes for forming injection molded plastic articles having weatherable paint film surface. U.S. Pat. No. 5,114,789 discloses a protective and decorative sheet material having a transparent top coat. U.S. Pat. No. 6,254,712 discloses making high transparency protective and decorative films. U.S. Pat. No. 4,868,030 discloses applying a pre-painted carrier film to an automobile body. U.S. Patent Application Publication 2002/0055006 discloses multi-layer co-extruded ionomer. WO 02066249 discloses co-extruded polymeric coating. Finally WO 9841399 discloses a multi-layered polyester sheet material.

There is a need for an extrusion lamination process for forming a multi-layer sheet material wherein a weatherable clear layer is brought together with a relative low melting pigmented colored layer and an optional backing layer and the resulting multi-layer sheet under thermoforming conditions forms a part with very few imperfections and the multi-layer sheet material is recyclable since the weatherable clear layer can be readily separated from the sheet prior to a subsequent thermoforming operation.

SUMMARY OF THE INVENTION

This invention comprises a multi-layer sheet comprising, or produced from, a first polymer layer comprising a weatherable film of polyvinyl fluoride or polyvinylidene fluoride having an adhesive coating on one side; a second polymer layer extruded onto the adhesive coating of the first polymer layer; and optionally, a third polymer layer.

The invention also comprises a process for producing the multi-layer sheet material. The process can comprise combining, such as extruding, a pigmented polymer layer onto the adhesive coating surface of the first polymer layer to produce a multilayer structure; passing the multi-layer structure into a nip of two rolls under pressure; and optionally combining, such as extruding or laminating, a polymer or backing layer onto the pigmented polymer layer.

DETAILED DESCRIPTION OF THE INVENTION

References in the singular may also include the plural (for example, "a" and "an" may refer to one, or one or more) unless the context specifically states otherwise. The use of numerical values in the various ranges specified in this application, unless expressly indicated otherwise, are stated as approximations as though the minimum and maximum values within the stated ranges were both preceded by the word "about." In this manner, slight variations above and below the stated ranges can be used to achieve substantially the same results as values within the ranges. Also, the disclosure of these ranges is intended as a continuous range including every value between the minimum and maximum values.

All patents, patent applications and publications referred to herein are incorporated by reference.

For purposes of this invention the following terms are defined:

"Copolymer" means polymers containing two or more monomers and the term is intended to include both "bipolymers" and "terpolymers" as well as polymers produced from more than three co-monomers.

"Gloss" (20° and 60°) is defined in ASTM Standard D2457-97 as, n-angular selectivity of reflectance, involving surface reflected light, responsible for the degree to which reflected highlights or images of objects may be superimposed on a surface.

"Melt Index" (MI) of a polymer is determined by ASTM D 1238 using condition E (190° C./2.16 kg).

"Class A surface" is a surface that by itself has a DOI and gloss of at least 80 and 90.

The first polymer layer can comprise a weatherable film of polyvinyl fluoride (PVF) or polyvinylidene fluoride (PVDF) having an adhesive coating on one side.

The second pigmented polymer layer can be extruded onto the adhesive coating of the first polymer layer comprising (1) an ionomer resin of ethylene having a co-monomer content between 8-25% by weight, based on the weight of the copolymer, of a $C_3$-$C_8$ $\alpha,\beta$ ethylenically unsaturated mono-carboxylic acid with at least 35% of the acid moieties neutralized with metal ions and/or (2) a metallocene-catalyzed very low density polyethylene (m-VLDPE) and contains pigments, dyes, flakes, additives and any mixtures thereof.

The optional third thermoformable polymer backing layer can comprise or be produced from polyesters, polypropylene, co-polymers of polypropylene, random polymers of polypropylene, blends polypropylene and other polyolefins and can be in contact with and adhered to the second extruded layer.

The multi-layer sheet material can have a relative low level of adhesion between the top weatherable PVF or PVDF layer (may also be referred to as fluorocarbon layer) and the second colored or pigmented layer of an ionomer resin or m-VLDPE before any subsequent thermoforming or laminating of the sheet material. This makes it possible to recycle the multi-layer sheet since the fluorocarbon layer can be readily separated from the second layer and the backing layer. The second layer and the optional backing layer can be recycled for these are thermoplastics if not contaminated with fluorocarbon from the weatherable top layer. Once the fluorocarbon layer is separated, it also can be recycled.

Upon thermoforming a part from the novel sheet material or laminating the sheet material to another material, presumably due to the heat and pressure of either of the processes, the adhesive coating on the fluorocarbon layer can be activated and adhesion can be significantly increased between the fluorocarbon layer and the second layer thereby producing high quality automotive and truck parts, such as panels, doors and various other parts from the sheet material having acceptable levels of adhesion and appearance, such as gloss and DOI.

The second or pigmented polymeric layer containing pigments, flakes dyes and other additives is an ionomer resin or m-VLDPE. This layer can be extruded onto the fluorocarbon layer and is basically a non-oriented film layer which allow flakes, if they are present, to orient in parallel to the surface of the top layer before being passed into the nip of two rollers to provide a relatively low but acceptable level of adhesion between the two layers.

The resulting two-layer sheet structure can be thermoformed into a shape and subsequently back cladded with an appropriate polymeric material to form an automotive or truck part or panel or a decorative part or panel.

The optional third or backing layer (a polymeric layer) can be extruded or laminated onto the above 2 layered sheet structure using conventional techniques and provides the necessary level of stiffness to the resulting multi-layered structure so that it can be molded into a shaped object or cladded using an injection molding process to form automobile or truck parts, panels, doors, decorative parts and the like. The optional backing layer can be one or more polyester, polypropylene, co-polymers of polypropylene, random co-polymers of polypropylene, blends polypropylene and other polyolefins. After being thermoformed into a part, the adhesion between the fluorocarbon layer and the color layer can be increased and provide the high level of adhesion that for auto and truck parts and panels and for parts and panels for recreational vehicles.

The multi-layer sheet material can have an 10-100μ thick first polymeric clear layer, an adhesive layer of 1-10μ, a 200-1000μ thick pigmented polymeric layer and an optional 1000-4000μ thick third layer. In forming a part, the sheet material can be thermoformed and then a relatively thick layer of a compatible engineering polymer can be cladded onto the thermoformed sheet to provide the resulting part with the desired stiffness and strength. Typically, this layer may be 800-4000μ thick depending on the design of the part or panel which may be for autos, trucks, garden equipment and the like.

The first polymer layer of the multi-layer sheet material can be a clear layer of a weatherable film of PVF or PVDF that can be about 10-100μ in thickness. The clear layer can provide parts, panels, laminates that have scratch and mar resistant and weatherability and other desirable properties required of such products. The PVF film can be formed from a solution cast high molecular weight PVF that is available commercially under the trademark Tedlar® from E.I. DuPont de Nemours and Company (DuPont), Wilmington, Del. Typically, 0.5-2.0 mil (0.0125-0.050 mm) thick films are used.

PVDF film can be formed from a high molecular weight PVDF having a weight average Mw of 200,000-600,000, preferably 350,000-450,000. Blends of PVDF and alkyl (meth)acrylates polymers can be used in particular, polymethyl methacrylate. Typically, these blends can comprise 50-70% by weight of PVDF and 30-50% by weight of alkyl (meth)acrylate polymers, preferably, polymethyl methacrylate. Such blends may contain compatibilizers and other additives to stabilize the blend.

To provide an acceptable level of adhesion between the first and second layers of the novel sheet material, the PVF or PVDF film can be provided with a thin layer of an adhesive which can be an acrylic polymer and the adhesive layer can be placed in contact with the second layer. This layer can be clear and may contain one or more UV absorbers and/or UV stabilizers and other additives and mixtures thereof.

The second polymeric layer can be a pigmented layer containing pigments, dyes, flakes, such as aluminum flake, other additives, such as UV stabilizers and UV absorbers and mixtures of any thereof. An ionomer resin or m-VLDPE can be used as the polymeric component of the pigmented layer.

The ionomer resin used can be a copolymer of ethylene and a co-monomer with the co-monomer content being between 8-25% by weight, based on the weight of the copolymer, of a $C_3$-$C_8$ $\alpha,\beta$ ethylenically unsaturated monocarboxylic acid at least 35% of the acid moieties neutralized with metal ions. The ionomer resin can be prepared by conventional polymerization techniques well known to one skilled in the art and can be neutralized with metal ions, in particular zinc, lithium, sodium, magnesium, calcium and any mixtures thereof. Typically useful ionomers can have an acid mole content above 0.7%, neutralization of the acid functional groups to a level greater than 40% and a MI (Melt Index) of less than 5 and preferably in the range of 0.4-4.0.

The ionomers of the present invention can be derived from direct copolymers of ethylene and a $C_3$-$C_8$ $\alpha,\beta$ ethylenically unsaturated mono-carboxylic acid (ethylene acid copolymer) that is at least 35% neutralized with metal ions. "Direct copolymer" means that the copolymer is made by polymerization of monomers together at the same time, as distinct from a "graft copolymer" where a monomer is attached or polymerized onto an existing polymer chain. Methods of preparing such ionomers are well known and are described in U.S. Pat. No. 3,264,272, which is incorporated by reference herein. Preparation of the direct ethylene-acid copolymers on which the ionomers are based is described in U.S. Pat. No. 4,351,931, which is also incorporated by reference herein. Ethylene-acid copolymers with high levels of acid can be produced by use of "co-solvent technology" as described in U.S. Pat. No. 5,028,674 which is also incorporated herein by reference or by employing higher pressures than those at which copolymers with lower acid can be prepared.

The ethylene-acid copolymers used to make the ionomeric copolymer can be copolymers of ethylene and $C_3$-$C_8$ $\alpha,\beta$ ethylenically unsaturated mono-carboxylic acid, particularly acrylic or methacrylic acid. Preferred ethylene-acid copolymers are ethylene/acrylic acid and ethylene/methacrylic acid.

The ethylene-acid copolymers used to make the ionomer copolymers can have the acid moiety present in a high amount. The amount that will be considered as "high" can depend on which acid moiety is employed, particularly the molecular weight of the acid moiety. In the case of ethylene/ (meth)acrylic acid, the preferred acid level is 10 to 25, (preferably 12 to 22, more preferably 14 to 22) wt. % based on the weight of the copolymer. One skilled in the art can determine the "high" acid levels for other acid moieties that are needed to get the desired gloss levels. For example acid copolymer can be ethylene/12.5% acrylic acid and ethylene/15% methacrylic acid polymers. Generally, if the acid level of the copolymer is increased transition temperatures are lowered while the available acid moieties for neutralizing increase. Higher levels of neutralization (acid level times neutralization extent) can improve hardness and mar resistance.

The neutralizing moiety is preferably metal cations such as monovalent and/or bivalent metal cations. It is preferable to neutralize with metal cations. Preferred metal cations include sodium, zinc, lithium, magnesium and calcium or a combination of such cations. Zinc is most preferred.

The preferred level of neutralization can depend on the ethylene-acid copolymers employed and the properties desired. The percent neutralization of the acid groups can be 35% or greater. The level of acid and the degree of neutralization can be adjusted to achieve the particular properties desired. Higher neutralization yields harder products while more moderate neutralization yields tougher products.

Useful ionomer resins can comprise ethylene and 12-18% by weight, based on the weight of the copolymer, of methacrylic acid or 10-15% by weight, based on the weight of the copolymer, of acrylic acid and 35-75% neutralized with one of the aforementioned metallic ions, preferably zinc.

The metallocene catalyzed very low density polyethylenes (m-VLDPE) are made using conditions well known in the art for continuous polymerization. Typically polymerization temperatures of 0-250° C. and pressures from atmospheric to 1000 atmospheres (110 MPa) are used. Suspension, solution, slurry, gas phase or other polymerization methods can be used. A support for the catalyst can be used but preferably the catalysts are used in a homogeneous (soluble) manner. Suitable process conditions and catalysts that can be used to form the metallocene-catalyzed polyethylenes used in this invention are disclosed in U.S. Pat. No. 5,324,800, U.S. Pat. No. 5,278,272, U.S. Pat. No. 5,272,236, U.S. Pat. No. 5,405,922 and U.S. Pat. No. 5,198,401, which patents are hereby incorporated by reference. A preferred m-VLDPE has a density of 0.86 to 0.91 g/cm$^3$ and a MI of 0.5-4.0 g/10 min measured in accordance with ASTM D1238. For example, m-VLDPE is Affinity® PL 1880, an octene ethylene co-polymer having a density of 0.901 g/cm$^3$ made by Dow Chemical Corporation can be used.

Pigments can be generally used in amounts of approximately 1.0 to about 100 parts per hundred parts of polymer. Typical pigments that can be used include both clear pigments, such as inorganic siliceous pigments (silica pigments, for example) and conventional pigments. Conventional pigments that can be used include metallic oxides such as titanium dioxide, and iron oxide; metal hydroxides; metal flakes, such as aluminum flake; chromates, such as lead chromate; sulfides; sulfates; carbonates; carbon black; silica; talc; china clay; phthalocyanine blues and greens, organo reds; organo maroons and other organic pigments and dyes. Preferred are pigments that are stable at high temperatures.

Pigments that provide flake effect colors, such as aluminum flake, coated mica flakes and various other flake pigments can be used since the extrusion process allows the flakes to orient themselves in parallel to the surface of the sheet material. Typically, the flake effect pigments can be used in amount of 0.5-10% by weight based on the weight of the polymer used.

Pigments can be formulated into a millbase by mixing the pigments with a dispersing resin that may be the same as or compatible with the material into which the pigment is to be incorporated. Pigment dispersions can be formed by conventional means, such as sand grinding, ball milling, attritor grinding or two-roll milling. Other additives, while not generally needed or used, such as fiber glass and mineral fillers, anti-slip agents, plasticizers, nucleating agents, and the like, can be incorporated.

Ultraviolet (UV) light stabilizers, UV absorbers, antioxidants and thermal stabilizers, anti-slip agents, plasticizers, nucleating agents, and the like can be used. Preferably, these components are present in amounts of about 0.5 to about 3.0 (preferably, about 1.0 to about 2.0) parts per hundred parts by weight of the polymer but may be present in lower or higher levels.

Other Components can include additives normally compounded into plastics or added to coating compositions in the adhesive layer and the second co-extruded polymer layer as required for the end use of the resulting product that is formed, i.e., automotive or truck part or panel or laminates or films. These requirements and the additives needed to meet these requirements are well known to those skilled in the art. Typical of the materials that are needed are, for example, UV absorbers, UV hindered amine light stabilizers, antioxidants and thermal stabilizers, processing aids, and the like.

If the part is to be exposed to ultraviolet (UV) light, it is preferred to include one or more UV stabilizers and/or absorbers in the adhesive layer and optionally, in the pigmented layer. Typical UV stabilizers are hindered amine light stabilizers, such as bis(1,2,2,6,6 pentamethyl-4-piperidinyl sebacate) and di[4(2,2,6,6,tetramethyl piperidinyl)] sebacate, poly[[6-[1,1,3,3-tetramethylbutyl]amino-s-triazine-2,4-diyl][(2,2,6,6-tetramethyl-4-piperidyl)imino] hexamethylene[(2,2,6,6-tetramethyl-4-piperidyl)iminol]], Chimassorb® 2020 1,6-hexanediamine, N,N'-bis(2,2,6,6-tetramethyl 1-4-piperidyl)-, polymer with 2,4,6-trichloro-1,3,5-triazine, reaction products with N-butyl-1-butanamine and N-butyl-2,2,6,6-tetramethyl-4-piperidinamine, Tinuvin® NOR 371, a triazine derivative and any mixtures thereof.

Typically useful UV absorbers include: benzophenones, such as hydroxy dodecyloxy benzophenone, 2,4-dihydroxybenzophenone, hydroxybenzophenones containing sulfonic groups and the like; triazoles, such as 2-phenyl-4-(2',2'-dihydroxylbenzoyl)-triazoles; substituted benzothiazoles, such as hydroxyphenylthiazoles and the like; triazines, such as 3,5-dialkyl-4-hydroxyphenyl derivatives of triazine, sulfur containing derivatives of dialkyl-4-hydroxy phenyl triazines, hydroxy phenyl-1,3,5-triazine and the like; benzoates, such as dibenzoate of diphenylol propane, tertiary butyl benzoate of diphenylol propane and the like; and others, such as lower alkyl thiomethylene containing phenols, substituted benzenes such as 1,3-bis-(2'-hydroxybenzoyl)benzene, metal derivatives of 3,5-di-t-butyl-4-hydroxy phenyl proprionic acid, asymmetrical oxalic acid, diarylarides, alkylhydroxy-phenyl-thioalkanoic acid ester, and hindered amines of bipiperidyl derivatives.

Preferred UV absorbers and hindered amine light stabilizers, all available from Ciba Geigy, are TINUVIN® 0.234 (2-(2H-benzotriazol-2-yl)-4,6-bis(1-methyl-1-phenylethyl) phenol), TINUVIN® 327 (2-(3',5'-di-tert-butyl-2'-hydroxyphenyl)-5 chlorobenzotriazole), TINUVIN® 328 (2-(2'hydroxy-3',5'-di-tert-amylphenyl)benzotriazole), TINUVIN® 329 (2-(2'-hydroxy-5'-tert-octylphenyl)benzotriazole), TINUVIN® 765 (bis(1,2,2,6,6-pentamethyl-4-piperidinyl) sebacate), TINUVIN® 770 (bis(2,2,6,6-tetramethy -4-piperidinyl)decanedioate),and CHIMASSORB® 944 (N,N-bis (2,2,6,6-tetramethyl-4-piperidinyl)-1,6-hexanediamine polymer with 2,4,6-trichloro-1,3,5-triazine and 2,4,4-trimethyl-1,2-pentanamine.

Preferred thermal stabilizers, all available from Ciba Geigy, are IRGANOX® 259 (hexamethylene bis(3,5-di-tert-butyl-4-hydroxyhydrocinnamate), IRGANOX® 1010 (3,5-bis(1,1-dimethylethyl)-4-hyroxybenzenepropanoic acid, IRGANOX® 1076 (octadecyl 3,5-di-tert-butyl-4-hydroxyhydrocinnamate), Iragnox® 1098 (N,N-hexamethylene bis(3,5-di-tert-butyl-4-hydroxyhydrocinnamamide), IRGANOX® B215 (33/67 blend of IRGANOX® 1010 with tris(2,4-di-tert-butylphenyl)phosphite), IRGANOX® B225 (50/50 blend of IRGANOX® 1010 with tris(2,4-di-tert-butylphenyl)phosphite), and IRGANOX® B1171 (50/50 blend of IRGANOX® 1098 with tris(2,4-di-tert-butylphenyl)phosphite).

The optional third polymer layer material can be any polymers that can provide the backing stiffness, rigidity and other properties so that the resulting multi-layer sheet can be thermoformed and/or can adhere to the second polymer layer. Typically useful are polyesters, polypropylene, co-polymers of polypropylene, random polymers and co-polymers of polypropylene, blends polypropylene and other polyolefins, and the like. This optional third layer can be applied to the sheet material of the first and second polymer layers by extrusion or lamination and the resulting sheet can be thermoformed into the desired shape to form, for example a part or panel. After thermoforming, the sheet can be back cladded with a fourth stiffening layer usually of a low cost polymer material. Another option is to thermoform the sheet material of the first and second polymer layers and then back clad the formed sheet by injection molding with a third polymer stiffening or cladding layer.

Any of the materials used in the third layer can be used as a cladding material to provide processibility and high level of adhesion. Additional useful cladding materials include other high modulus resins that are compatible and form an excellent adhesive bond between the sheet material and the resin that are conventionally used in the manufacture of parts, panels laminates used, for example, in autos, trucks and recreational vehicles.

In the process for forming the multi-layer sheet material, the fluorocarbon layer (film of PVF or PVDF) can be placed into contact with a supporting film of a biaxially oriented polyester film and a layer of the pigmented polymer layer (ionomer resin or m-VLDPE) can be extruded onto the surface of the fluorocarbon layer and the resulting multi-layer structure is passed into a nip of two rolls under pressure and optionally, the third layer can be extruded onto the pigmented polymeric layer.

The polyester film on the multi-layer sheet material can protect the surface of the sheet material and keeps the surface of the sheet material free from dust and debris that can be present and cause surface defects on thermoforming. Generally, the polyester film can be kept in contact with the multi-layer sheet material and removed just before any thermoforming process.

Parts of the multi-layer sheet material can be formed by removing the polyester supporting film, thermoforming the sheet and then, optionally, back-cladding the thermoformed sheet with a polymeric cladding material described above to form a part. In the thermoforming process, sufficient heat and pressure are applied to bond the weatherable top layer to the second pigmented layer.

The laminating of the weatherable layer to the pigmented polymer layer can be a simple processing requiring minor modifications to sheet extrusion equipment by the use of a biaxial oriented polyester film as a support sheet for the thin PVF or PVDF film. The bond between the weatherable film layer and the polyester film is low so that the polyester film can readily be removed when needed. Also, the bond between the first polymeric layer of a film of a weatherable fluorocarbon polymer and the pigmented polymeric second layer can be low prior to thermoforming or lamination which allows for the removal of the fluorocarbon containing weatherable film to allow for recycling of the pigmented polymeric layer as well as the separated fluorocarbon containing weatherable film.

The combination of the pigmented polymeric layer and the high melting fluorocarbon-containing weatherable film layer during vacuum or pressure forming of the multi-sheet material significantly can reduce imperfections in the surface of the piece being molded. The pigmented polymeric layer containing an ionomer resin or a m-VLDPE can have a sufficiently low melting temperature and will melt and relax and reduce surface imperfections during the thermoforming process. Also, the low melting temperature and modulus of the pigmented polymeric layer can improve the mar resistance of the weatherable top layer of the sheet material.

Also, the process allows for maximum flake orientation in the pigmented second polymeric layer. The flakes can be allowed to orient in parallel to the surface of the sheet to provide for a uniform appearance and improved "flop". For example, color differences observed on sheets containing metallic flake pigments when viewed at a 15° angle down the machine direction (MD) of the sheet in comparison to viewing up the MD of the sheet had an acceptable color variation. Also, color differences in the transverse direction of the sheet in comparison to the MD of the sheet can be also acceptable.

The present invention is further illustrated in the following Examples, which do not limit the scope of the invention. In the Examples, all parts and percentages are on a weight basis unless otherwise indicated.

EXAMPLE 1

The following weatherable film was used to form the multi-layer sheet material: Tedlar® PVF film CUA10AH836 sold by DuPont and is a nominally 1 mil (0.0254 mm) thick solution cast PVF film one side coated with an acrylic adhesive containing 0.2% by weight of Tinuvin® 328 (described above) and 0.5% by weight Chimassorb® 119 and is approximately 0.008 mm thick. The acrylic adhesive is a commercial product code no. 68080 sold by DuPont. The PVF film is cast onto a 3 mil (0.076 mm) thick biaxially oriented PET film (polyethylene terephthalate film).

The following pigmented polymeric concentrates were used to form the second pigmented polymeric layer of the multi-layer sheet materials.

Ionomer pigment concentrate—Surlyn® SG 771 NC002, sold by DuPont, an ethylene/methacrylic acid ionomer containing 15% methacrylic acid 70% neutralized with zinc, MI 0.7 (190° C.), melt point 80° C. and a density 0.96 g/cm$^3$ was dry blended with 7.5 wt. % of a aluminum flake concentrate of 20 weight percent aluminum flake (Sparkle Silver® SSP132AR manufactured by Siberline) in Nucrel® 960 manufactured by DuPont. The concentrate was dried overnight at 45° C. using a desiccated hopper dryer system supplied by Conair Corp.

m-VLDPE pigment concentrate—Affinity® PL 1880 is an octene ethylene co-polymer having a MI of 1, melt point of 102° C. and a density of 0.901 g/cm³ made by Dow Chemical Corporation was dry blended with 7.5 wt. % of a aluminum flake concentrate of 20 weight percent aluminum flake (Sparkle Silver® SSP132AR manufactured by Siberline) in Nucrel® 960 manufactured by DuPont. The concentrate was dried overnight at 45° C. using a desiccated hopper dryer system supplied by Conair Corp.

The multi-layer sheet material was formed as follows: the pigment concentrate was charged into a nitrogen swept hopper of a single screw extruder fitted with a 3/1 compression ratio single flighted screw with a 5 L/D of a melt mixing section. The flight depth in the feed section was 5.3 mm. The extruder dies was 152 mm wide coat hanger type flat film die with a 0.38 mm die gap. The molten pigment concentrate exiting the die was drawn down to a nominal 0.4 to 0.8 mm thick sheet and cast onto the Tedlar® film supported by the PET film on a casting roll and then into the nip of a pneumatically operated 127 mm diameter chrome nip roll and the casting roll to pin the layer of pigment concentrate to the Tedlar® film. The laminated sheet was wound onto a 76 mm paper core and stored.

To minimize or eliminate any wrinkles in the Tedlar® film, it was necessary to apply a significant amount of tension to the unwind of the roll of Tedlar® film that was supported by the PET film. Tension was not measured but was estimated to be on the order of 17 Ncm (10 lbf/in) of web.

Using the above process, the following two sheet multi-layer sheet materials were formed. (1) Tedlar® weatherable film/ionomer resin pigmented layer and (2) Tedlar® weatherable film m-VLDPE resin pigmented layer.

For both of the multi-layer sheets (1) and (2), before any thermoforming or laminating process, the Tedlar® weatherable film was readily removable and the Tedlar® film and the pigmented layer could be recycled.

Both of the multi-layer sheets had an excellent appearance in particular, good gloss and DOI. Flop measured up-field and downfield in the MD of the sheet had only slight but acceptable differences. Both sheets were thermoformable using conventional techniques after removal of the PET film and resulted in a thermoformed structure that could be made into an auto or truck part. Adhesion between the Tedlar® film and the pigmented layer in both sheets increased significantly after thermoforming and was acceptable for auto and truck parts. Appearance of the thermoformed parts was excellent particularly in regard to gloss and DOI. Each of the thermoformed sheets had excellent outdoor weathering properties.

What is claimed is:

1. A thermoformable multi-layer sheet comprising or produced from a cast film comprising a weatherable film and a second polymer layer wherein the weatherable film is a material selected from the group consisting of polyvinyl fluoride (PVF) and polyvinylidene fluoride (PVDF) and has an adhesive coating on one side of the cast film and the coating is an acrylic polymer comprising one or more UV absorbers, UV stabilizers, or mixtures thereof;

the second polymer layer, extruded onto the adhesive coating of the cast film and the second polymer layer, is an ionomer resin of a copolymer of ethylene and 8-25% by weight, based on the weight of the copolymer, of a $C_3$-$C_8$ α,β ethylenically unsaturated monocarboxylic acid at least 35% of acid moieties neutralized with metal ions and said second polymer layer contains pigments, dyes, flakes, flake pigments, or any mixtures thereof; and optionally, a third polymer layer in direct contact with the second layer and adhered to the second polymer layer, wherein the sheet has a distinctness of image of at least 60.

2. The sheet of claim 1 wherein the second polymer layer contains 0.5-10% by weight, based on the weight of the ionomer, of flake pigments.

3. The sheet of claim 1 wherein the second polymer layer consists essentially of an ionomer resin of ethylene and 12-18% by weight, based on the weight of the copolymer, of methacrylic acid or 10-15% by weight, based on the weight of the copolymer of acrylic acid, and 35-75% neutralized with metallic ion selected from the group consisting of zinc, lithium, sodium, magnesium, calcium and any mixtures thereof and having a Melt Index of 0.4 -4.0 and contains pigments, dyes, flakes and any mixtures thereof.

4. The sheet of claim 3 wherein the first polymer layer is the PVF cast film and the second polymer layer is the ionomer resin.

5. The sheet of claim 3 wherein the first polymer layer is the PDVF cast film and the second polymer layer is the ionomer resin.

6. The sheet of claim 1 wherein the second polymer layer is the ionomer of comprising ethylene and, based on the weight of the copolymer, 12-18% of methacrylic acid or 10-15% of acrylic acid and is neutralized with zinc and contains pigments, dyes, flakes, flake pigment, or any mixtures thereof.

7. The sheet of claim 1 further comprising a third polymer layer applied by extrusion or lamination to the second polymer layer.

8. The sheet of claim 7 thermoformed into an auto part, auto panel, truck part or truck panel.

9. The sheet of claim 1 further comprising a third polymer layer applied by extrusion or lamination to the second polymer layer and back cladded with a fourth polymer layer.

10. The sheet of claim 9 thermoformed into an auto part, auto panel, truck part or truck panel.

11. The sheet material of claim 1 wherein the structure of the cast film and second polymer layer is thermoformed into a structure and then back cladded by injection molding with a third polymer layer.

12. An article comprising the thermoformable sheet of claim 1 wherein the article comprises an auto part, a truck part, an auto or truck body panel, or a part or panel of a recreational vehicle and the sheet has a Class A surface.

* * * * *